United States Patent
Takagi

(10) Patent No.: US 7,339,765 B2
(45) Date of Patent: Mar. 4, 2008

(54) SLIDER WITH AIR BEARING SURFACE WITH SELECTED DISTANCES BETWEEN RECORDING/REPRODUCING ELEMENT AND REAR-RAIL FOR REDUCING VARIATION IN FLYING HEIGHT

(75) Inventor: Susumu Takagi, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 355 days.

(21) Appl. No.: 11/052,475

(22) Filed: Feb. 8, 2005

(65) Prior Publication Data

US 2005/0207065 A1  Sep. 22, 2005

(30) Foreign Application Priority Data

Feb. 10, 2004  (JP) .............................. 2004-032774

(51) Int. Cl.
*G11B 5/60* (2006.01)
(52) U.S. Cl. ................................. 360/235.7; 360/236.5
(58) Field of Classification Search ............. 360/235.7, 360/236.5
See application file for complete search history.

(56) References Cited

U.S. PATENT DOCUMENTS 6,317,294 B1 * 11/2001 Wada et al. ............. 360/235.6
6,934,123 B2 * 8/2005 Kohira et al. ............ 360/235.7
7,038,883 B2 * 5/2006 Tsuchiyama et al. .... 360/235.6

FOREIGN PATENT DOCUMENTS

| JP | 06176557 A | 6/1994 |
| JP | 11149733 A | 6/1999 |
| JP | 2000057724 A | 2/2000 |

\* cited by examiner

Primary Examiner—A. J. Heinz
(74) Attorney, Agent, or Firm—Steptoe & Johnson LLP

(57) ABSTRACT

There are provided a slider and a magnetic disk unit that can significantly reduce a variation in flying height caused by an air pressure change even if the size of the magnetic disk unit or the slider is small. An air bearing surface (1) which faces a disk medium includes, in the order from the air-inflow end (2) to the air-outflow end (3) of the air bearing surface: a front step bearing surface (9), a front-rail surface 6 which generates a positive pressure on the disk medium to float the slider, a negative-pressure cavity (11) which generates a negative pressure to reduce the flying height of the slider, a rear step bearing surface (10), a rear-rail surface (7) which generates a positive pressure, and a recording/reproducing element having surface (8) on which the recording/reproducing element (13) is provided, wherein a separating plane (103) which separates the recording/reproducing element having surface (8) from the rear-rail surface (7) is provided and the distance between the air-outflow end of the rear-rail surface (7) and the recording/reproducing element (13) is 5 to 10% of the slider length from the air-inflow end to the air-outflow end.

15 Claims, 20 Drawing Sheets

Air-inflow to outflow distance

A-A' CROSS-SECTION

A-A' CROSS-SECTION

DISTANCE OF REAR-RAIL-AIR-OUTFLOW-END FROM RECORDING/
REPRODUCING ELEMENT/SLIDER LENGTH

A-A' CROSS-SECTION

A-A' CROSS SECTION

SLIDER WITH AIR BEARING SURFACE WITH SELECTED DISTANCES BETWEEN RECORDING/REPRODUCING ELEMENT AND REAR-RAIL FOR REDUCING VARIATION IN FLYING HEIGHT

FIELD OF THE INVENTION

The present invention relates to a slider and a magnetic disk unit, and more particularly, to a slider having an air bearing surface for the slider to fly above a data recording disk with the help of a disk rotation driving section such as a spindle motor, and a magnetic disk unit using the slider.

BACKGROUND OF THE INVENTION

As shown in FIG. 20, a typical magnetic disk unit 71 that records data on a disk includes, in a housing 75 of a metal such as aluminum alloy, a head assembly 76 consisting of a slider 72 and a suspension 78, a disk medium (hereinafter referred to a disk) 73 as a recording medium, a disk rotation driving section 74 such as a spindle motor, and an actuator mechanism 77 which moves the head assembly 76 across the information recording surface of the disk 73. The slider 72 has a recording/reproducing element which records and reproduces data on the disk 73 and is flown above the disk 73 by airflow generated by rotation of the disk 73 at a minute height. The slider 72 has a positive-pressure generating section and a negative-pressure generating section on the surface facing the disk 73 and designed so as to fly with a constant flying profile over the entire area of the disk 73 under a constant temperature and pressure by a static load from the suspension 78 and the balance between the positive and negative pressures generated from the slider 72.

In order to increase the recording density of a magnetic disk unit, it is important to reduce the flying height, which is defined by the gap between the slider with the recording/reproducing element and the disk. Presently, the flying height is as small as 10 to 15 nm and there is a demand for reducing the possibility of contact between the slider and disk by minimizing variations in the flying height caused by environmental changes, in view of the reliability of the magnetic disk unit. Furthermore, magnetic disk units are used in growing numbers of portable devices such as notebook personal computers. For magnetic disk units for portable devices, it is demanded that decreases of the flying height caused by environmental changes, especially air pressure changes in highlands, be reduced. As the flying height decreases significantly, the possibility of contact between the slider and disk increases. Especially, when the flying height decreases below a glide height, which is determined by the surface roughness of the disk, the possibility of contact between the slider and disk radically increases. At worst, the information recorded on the disk can be corrupted by a slider crash.

There is a conventional technique for minimizing decrease of the flying height caused by an air pressure variation in places such as highlands, in which a magnetic disk unit is sealed in a glass container filled with helium gas at a pressure lower than atmospheric pressure, a pressure variation is measured with a pressure sensor in the glass container, and the pressure inside the container is controlled by heating or cooling so as to be kept constant, thereby reducing a variation in flying height caused by an air pressure change in the external environment (for example Japanese Patent Laid-Open No. 6-176557).

A technique concerning slider structure is disclosed in Japanese Patent Laid-Open No. 11-149733, for example, in which the central cavity and the side cavities on the air bearing surface of a slider are different in depth so that negative pressure is kept in balance, thereby reducing a variation in flying height caused by an air pressure change in the external environment.

Another technique is disclosed in Japanese Patent Laid-Open No. 2000-57724, No. 2001-283548, and No. 2001-283549, in which a proper ratio of the depth of a submicron-deep front step bearing to the depth of a negative-pressure cavity is chosen to reduce a variation in flying height caused by an air pressure variation in the external environment.

Yet another technique is disclosed in FIGS. 1 and 7 of Japanese Patent Laid-Open No. 2001-297421, for example, in which a magnetic head slider has four planes at different depths, and the depth of the negative-pressure cavity is chosen to be in the range of approximately 400 nm to 1.3 µm, thereby reducing the difference in flying height between a lowland and a highland (at an altitude of 3,000 m) to approximately 2 nm (20% of the flying height).

DISCLOSURE OF THE INVENTION

However, the conventional configurations such as the one disclosed in Patent Document 1, have the problem that, because a magnetic disk unit is sealed inside a glass container filled with helium gas at a pressure lower than atmospheric pressure, a pressure variation is measured with a pressure sensor in the container, and the pressure inside the container is controlled by heating or cooling so as to be kept constant to reduce a variation in the flying height caused by an external pressure change, many additional arrangements such as the pressure sensor, helium gas sealing, and glass container are required.

In the conventional configurations such as those disclosed in Patent Documents 2 to 6, the depth of a negative-pressure generating cavity and the depth of a positive-pressure generating step bearing surface are optimized to reduce negative pressure generated under low air pressure, thereby canceling a decrease in positive pressure generation and minimizing decrease of flying height under low air pressure. However, the configurations have the problem that even in a conventional disk unit using a disk medium with a diameter of 95 mm or 65 mm there is a variation of 2 nm (20%) in flying height between a lowland and a highland (3,000 m) because of a variation in atmospheric pressure. For example, the clearance between a head and a disk at a flying height of 10 nm is calculated as follows. A disk of this generation has a glide height of approximately 4.5 nm. A head has a flying height variation of approximately 2.5 nm because of manufacturing variations. The 10-nm flying height is the flying height at the recording/reproducing head element. The flying height at the lowest flying position of the slider is lower than that at the recording/reproducing head by approximately 0.5 nm. Furthermore, a change of approximately 1 nm in flying height caused by a seek by the magnetic disk unit must be factored in. If a flying height variation of 20%, or a flying height change due to an air pressure change of 2 nm is added, the clearance will amount to 10−4.5−2.5−0.5−1.0−2.0=−0.5 nm. A clearance of −0.5 nm cannot ensure prevention of contact between the head and disk in disk drives, and a decrease of 20% in flying height due to an air pressure change is not acceptable for disk drives of the feature that will require lower flying heights. It will be required that decreases in flying height due to an air pressure change be preferably 10% or less, or 15% at worst.

Small-size magnetic disk units using small recording disk media with a diameter of 48 mm or 27 mm which are being developed are often incorporated in mobile devices and accordingly require that variations in the flying height of the slider caused by air pressure changes be small. However, it is difficult to ensure adequate air pressure change characteristics of such a small-size magnetic disk unit because the revolution speed of spindle motor of a small-size magnetic disk unit in practical use is chosen to be low in order to reduce power consumption and noise. Because of the reduction in disk diameter and revolution speed of the spindle motor, the relative velocity between the slider and the disk slow compared with conventional disk units using disk media with a diameter of 95 mm or 65 mm and consequently the airflow that forms an air bearing surface is small. Sliders having smaller air bearing surfaces than conventional sliders, called femto sliders, are also being introduced in small-size magnetic disk units with the aim of increasing the effective recording area of magnetic disks, improving impact resistance, and reducing power consumption. These sliders also make it difficult to ensure adequate air pressure change characteristics because the absolute airflow forming an air bearing surface is smaller than that in conventional sliders.

The present invention solves these problems with the conventional art, and an object of the present invention is to provide a slider that can significantly reduce variations in the flying height in a conventional disk unit with disk media having a diameter of 95 mm or 65 mm as well as in a smaller disk unit even if the slider is small, and to provide a magnetic disk unit that uses the slider.

To solve the problems with the conventional art, the present invention provides a slider having a recording/reproducing element for recording and/or reproducing data on a disk medium and an air bearing surface which faces the disk medium, the air bearing surface including: a front step bearing surface, at least one front-rail surface which generates a positive pressure on the disk medium to float the slider, a negative-pressure cavity which generates a negative pressure to reduce the flying height of the slider, a rear step bearing surface, at least one rear-rail surface which generates a positive pressure, and a recording/reproducing element having surface on which the recording/reproducing element is provided, in the order from the air-inflow end to the air-outflow end of the air bearing surface, wherein a separating plane which separates the recording/reproducing element having surface from the rear-rail surface is provided and the distance between the air-outflow end of the rear-rail surface and the recording/reproducing element is 5 to 10% of the slider length from the air-inflow end to the air-outflow end. With this configuration, decrease of the flying height of the recording/reproducing element provided at the air-outflow end when air pressure has decreased can be reduced.

By using a slider according to the present invention in a conventional magnetic disk unit with a disk medium having a diameter of 95 mm or 65 mm, variations in the flying height can be significantly reduced. The present invention can reduce variations in the flying height even in a smaller magnetic disk unit or if the slider is small.

DESCRIPTION OF THE EMBODIMENTS

A slider according to the present invention has a recording/reproducing element for recording and/or reproducing data on a disk medium and an air bearing surface which faces the disk medium. The air bearing surface includes, in the order from the air-inflow end to the air-outflow end of the air bearing surface, a front-step bearing surface, at least one front-rail surface which generates a positive pressure on the disk medium to float the slider, a negative-pressure cavity which generates a negative pressure to reduce the flying height of the slider, a rear step bearing surface, at least one rear-rail surface which generates a positive pressure, and a recording/reproducing element-having surface on which the recording/reproducing element is provided, wherein a separating plane which separates the recording/reproducing element-having surface from the rear-rail surface is provided and the distance between the air-outflow end of the rear-rail surface and the recording/reproducing element is 5 to 10% of the slider length from the air-inflow end to the air-outflow end.

The front rails of the present invention are positioned in a number of separate positions along the slider roll direction. The front rails of the slider are positioned in two positions along the slider roll direction, one of which is positioned along the disk-inner-radius end of the slider and the other is positioned along the disk-outer-radius end of the slider.

The front-step-bearing surface of the slider of the present invention surrounds the front-rail surface and extends along the disk-inner-radius-side and the disk-outer-radius-side of the slider towards the air-outflow end, and a middle rail which generates a positive pressure is provided in the extending portion.

Embodiments of a slider of the present invention and a magnetic disk unit using the slider will be described below in detail with reference to the accompanying drawings.

First Embodiment

Figure 1A:
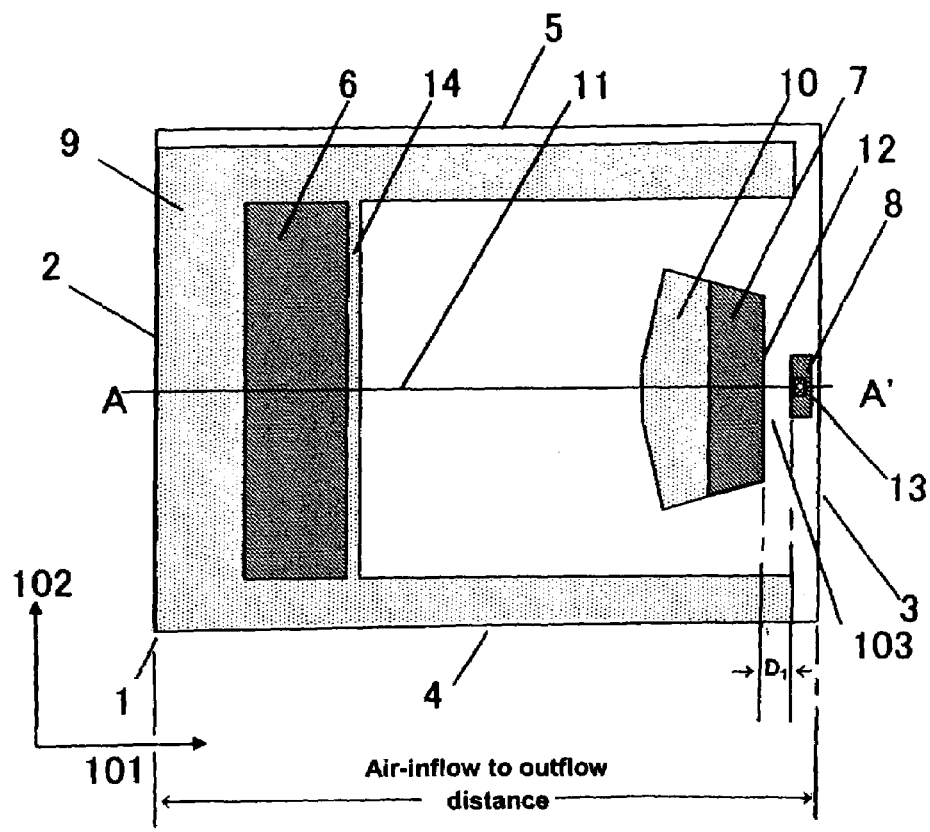
FIG. 1A is a plan view of a slider according to a first embodiment of the present invention.
Figure 1B:
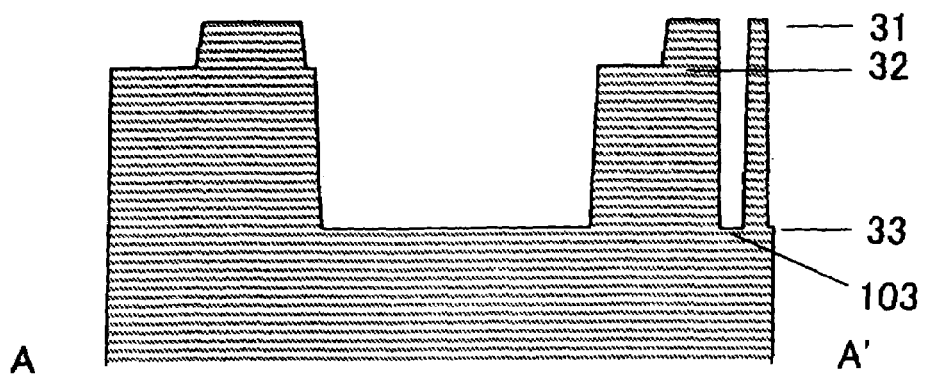
FIG. 1B shows a cross-sectional view of the slider taken along line A-A' in FIG. 1A.

FIG. 1 shows a plan view of a slider according to a first embodiment of the present invention and a cross-sectional view taken along line A-A' in the plan view. The slider according to the first embodiment has the shape of generally rectangular parallelepiped with a length of 1.25 mm in the slider pitch direction (101) and a length of 1.00 mm in the slider roll direction (102) and is of the size of the so-called pico-slider. An air bearing surface 1 in FIG. 1 has a slider-air-inflow end 2, a slider-air-outflow end 3, a slider-disk-inner-radius-end 4, and a slider-disk-outer-radius-end 5. The slider also has a front-rail surface 6, a rear-rail surface 7, and a recording/reproducing element-having surface 8 with a recording/reproducing element 13, which are components constituting a first plane 31 closest to a magnetic disk (hereinafter referred to as the "disk"), not shown, when the slider faces the disk, a front-step-bearing surface 9 and a rear-step-bearing surface 10, which are components constituting a second plane 32 farther from the disk than the first plane 31, and a negative pressure cavity 11, which is a component constituting a third plane 33 father from the disk than the second plane 32.

The first plane 31 to the third plane 33 are flat planes substantially parallel to each other. The depth of the second plane 32 with respect to the first plane 31 is 150 nm; the depth of the third plane 33 with respect to the first plane 31 is 1,500 nm.

A rear-rail surface-air-outflow end 12 of the rear-rail surface 7 is positioned away from the recording/reproducing element 13 and slightly closer to the slider-air-inflow end 2 so that distance $D_1$ between the recording/reproducing element 13 and the rear-rail surface-air-outflow end 12 is 70 µm. A separating plane 103 is formed at a depth of 1,500 nm, which is the same depth of the third plane 33.

Figure 2:
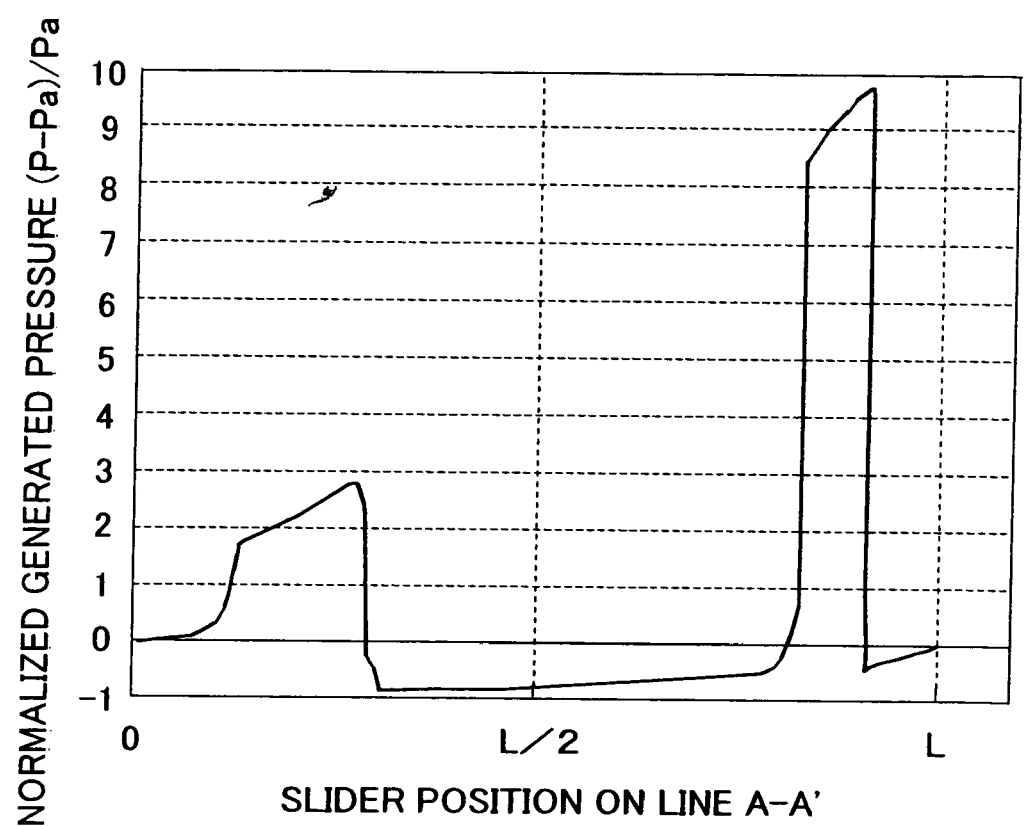
FIG. 2 is a diagram showing pressure distribution on line A-A' of the slider according to the first embodiment.

FIG. 2 shows pressure distribution on line A-A' in FIG. 1, obtained when the slider of the first embodiment was flown at a radius of 21 mm of the center of the disk, that is, near the center of the data recording area of a drive having a disk diameter of 65 mm, commonly called a 2.5-inch hard disk drive, at a skew angle of 0 degrees, and at a disk speed of 5,400 rpm. The length in the slider pitch direction is denoted by L, the position of the slider is represented by the horizontal axis, and normalized generated pressure (P–Pa)/Pa is represented by the vertical axis, which is obtained by normalizing the pressure (P) generated at each position by atmospheric pressure (Pa). It can be seen from FIG. 2 that the peak of a first positive pressure is near the air-outflow end 14 of the front-rail surface 6, a negative pressure is generated in the negative-pressure cavity 11, the peak of a second positive pressure is near the air-flow-end 12 of the rear-rail surface 7, and no substantial positive pressure is generated on the recording/reproducing element having surface 8.

Figure 3A:
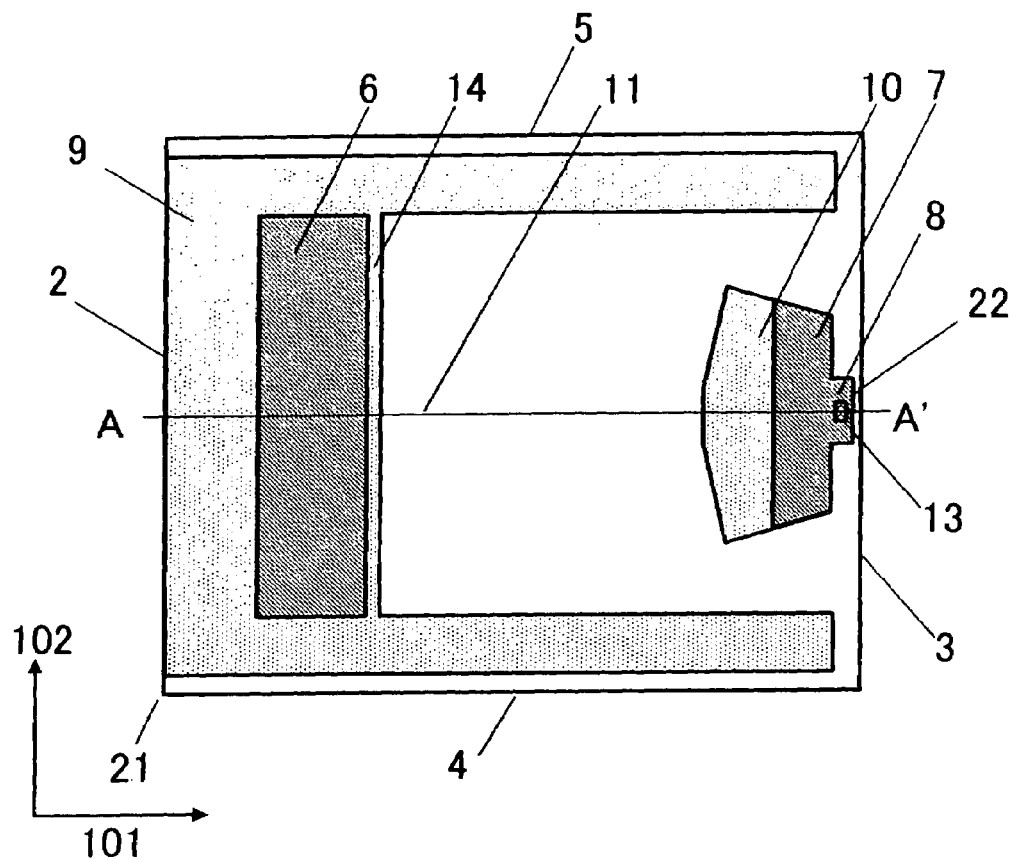
FIG. 3A is a plan view of a conventional slider.
Figure 3B:
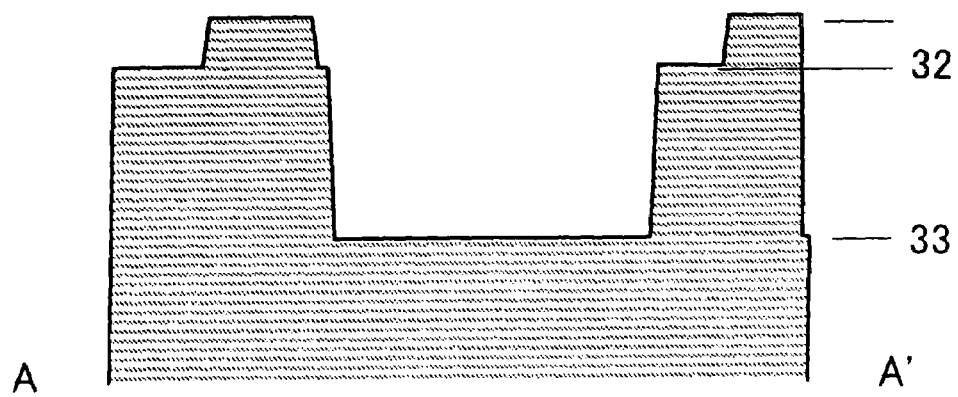
FIG. 3B is a cross-sectional view taken along line A-A' in FIG. 3A.
Figure 4:
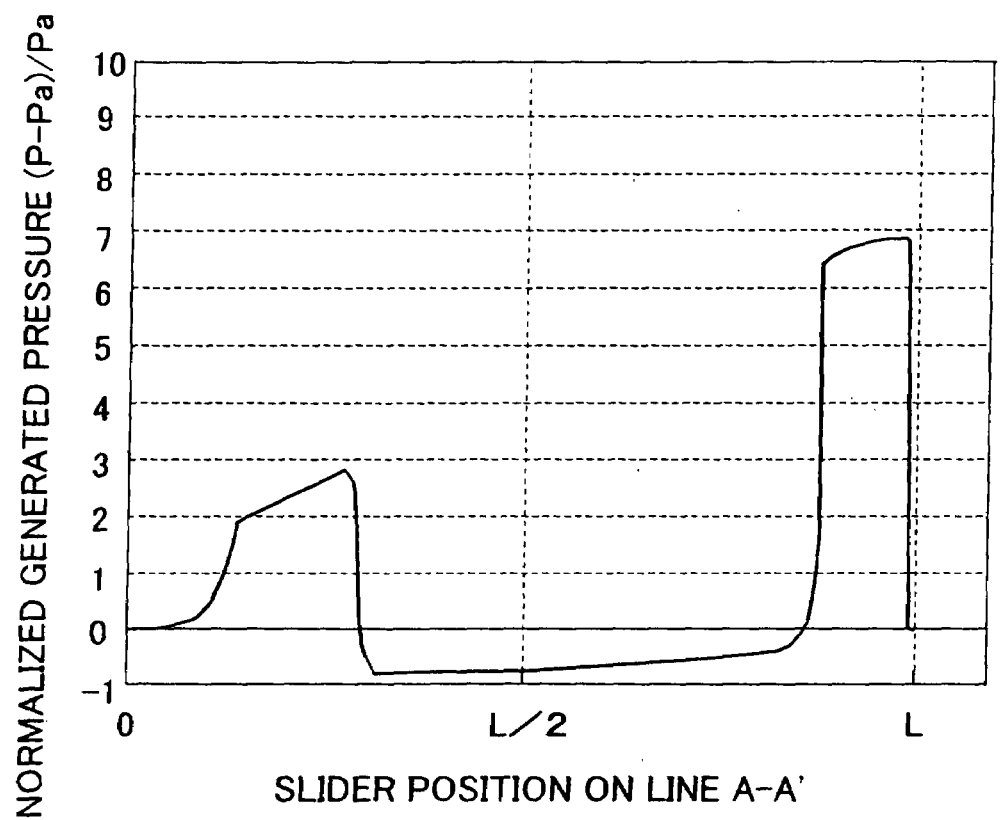
FIG. 4 is a diagram showing pressure distribution on line A-A' of the conventional slider.

FIG. 3 shows the shape of the air bearing surface 21 of a conventional slider. The conventional slider differs from the air bearing surface 1 of the slider of the present invention in that the rear-rail surface 7 is contiguous to the recording/reproducing element having surface 8. FIG. 4 shows, in a way similar to FIG. 2, pressure distribution on line A-A' in FIG. 3, obtained when the conventional slider with a conventional air bearing surface 21 was flown at a radius of 21 mm of the center of the disk, that is, near the center of the data recording area of a drive having a disk diameter of 65 mm, commonly called a 2.5-inch hard disk drive, at a skew angle of 0 degrees, and at a disk speed of 5,400 rpm. It can be seen that the peak of a first positive pressure is near the air-outflow end 14 of the front-rail surface 6, a negative pressure is generated in the negative-pressure cavity 11, and the peak of a second positive pressure is near the air-outflow end 22 of the contiguous surface consisting of the rear-rail surface 7 and the recording/reproducing element having surface 8.

Figure 5:
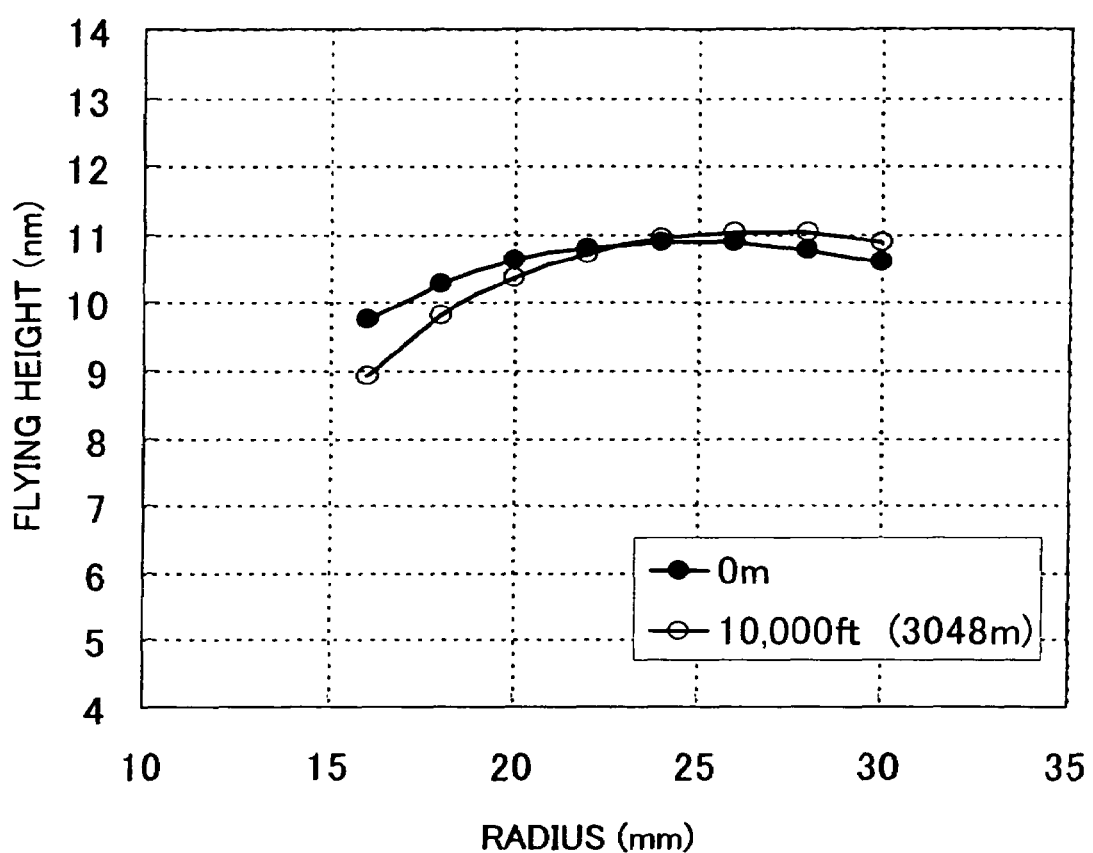
FIG. 5 is a diagram showing flying height profiles of the slider according to the first embodiment of the present invention at sea level and at an altitude of 10,000 ft. above sea.

FIG. 5 shows flying profiles obtained when the slider of the first embodiment having the air bearing surface 1 was flown above a disk having a diameter of 65 mm at a revolution speed of 5,400 rpm at sea level (at 1 atmospheric pressure) and an altitude of 10,000 ft. above sea level (at an atmospheric pressure of approximately 0.7). In the highland, the decrease of the flying height at the inner radius of the disk is 1 nm or less; the flying height increased at the outer radius and the variation was also 1 nm or less. Thus, the difference between changes in the flying height in the flying profile at sea level and at an altitude of 10,000 ft. is 1 nm or less, or 10% or less of the flying height, over the entire area from the innermost to outermost radius.

As a measure of effect of such air pressure change, air pressure change characteristics are defined by the ratio of the flying height of the slider at an altitude of 10,000 ft. above sea level (at an atmospheric pressure of approximately 0.7) to the flying height of the slider at sea level (at 1 atmospheric pressure). As the decrease of the flying height increases, the possibility of the slider contacting the disk and causing a head crash increases. Accordingly, it can be considered that the smaller the decrease in flying height, namely the above-described ratio, the better the air pressure change characteristics. However, if the flying height is far higher than a specified value assumed for the drive, the error rate of the drive increases. Therefore, in terms of the reliability and performance of the drive, ideally the best air pressure change characteristics may be 100%. In today's drive design, characteristics of at least 80% is required. However, providing a sufficient flying clearance will become difficult as flying height decreases, and characteristics of nearly 100% is being demanded. The flying clearance at a 10-nm flying height of the recording/reproducing head 13 is estimated as follows. The glide height of a magnetic disk of this generation is approximately 4.5 nm, the manufacturing variations of the flying height of the head is approximately 2.5 nm, the decrease of the flying height during a seek operation is approximately 1 nm, and the difference in flying height between the recording/reproducing element 13 and the lowest flying position is approximately 0.5 nm. Therefore, unless the decrease of the flying height at high altitude is reduced to approximately 1.5 nm, which is 15% of the flying height, it is difficult to reliably prevent contact between the magnetic head (slider) and the disk. Given that flying height will be further reduced in the future, preferably reduction in the flying height due to an air pressure change should be decreased to 10% or so.

Figure 6:
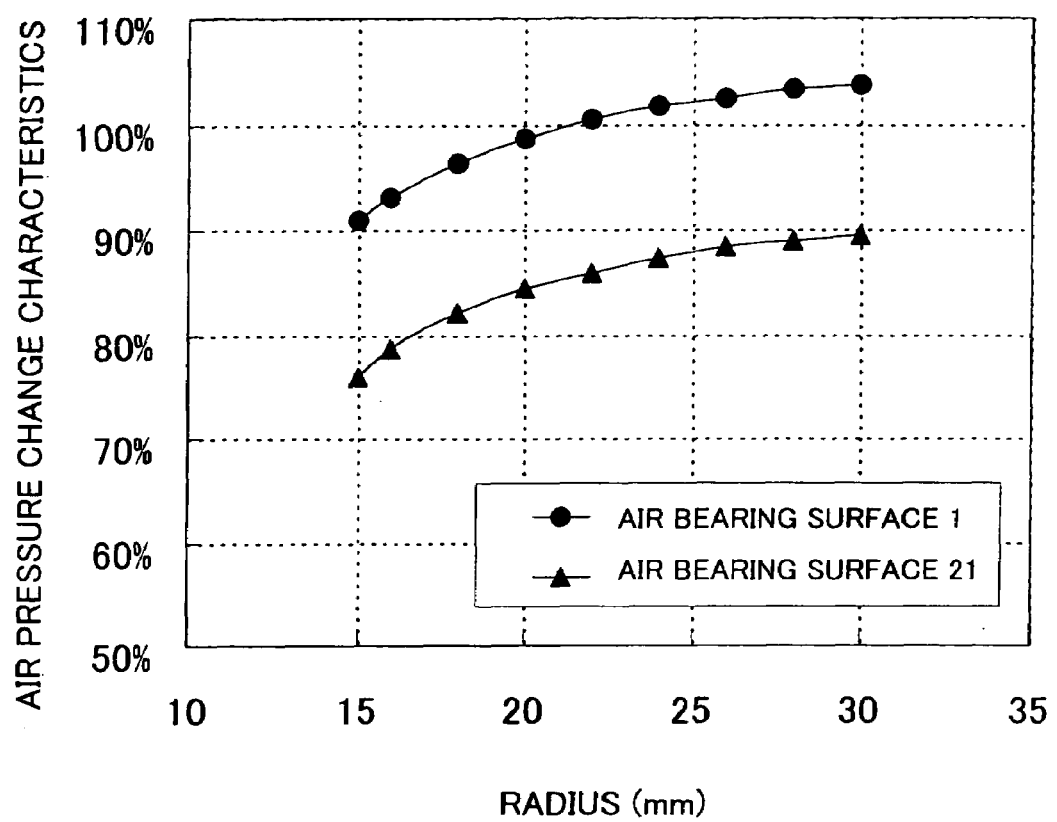
FIG. 6 is a diagram showing a comparison between air pressure change characteristics of the slider according to the first embodiment of the present invention and the conventional slider.

FIG. 6 shows a comparison between the air pressure change characteristics obtained by using the air bearing surface 1 of the slider of the first embodiment and the air bearing surface 21 of a conventional slider. The air pressure change characteristics shown were measured at a revolution speed of 5,400 rpm. The air pressure change characteristics obtained by using the slider of the first embodiment are all within the range from 90% to 10% at all radii of the disk. In contrast, the air pressure change characteristics obtained by using the conventional slider are approximately 90% at the outer radius of the disk and 80% at the inner radius. If changes in slider flying height and flying attitude caused by a drop in air pressure are considered in two dimensions in the direction of the pitch of the slider, the positive pressure generated on the air bearing surface 1, 21 decreases because airflow to the air bearing surface 1, 21 is reduced by the drop in air pressure. Consequently, the flying attitude may differ between mode in which the height of the entire slider decreases concurrently time and rotation mode in which the flying pitch attitude of the slider declines with the center at the position where the largest positive pressure is generated. On the air bearing surface 1 of the first embodiment, the rear-rail surface 7 is positioned slightly away from the recording/reproducing head 13 and slightly close to the slider-air-inflow end 2 as shown in FIG. 1. Accordingly, as shown in FIG. 2, the position at which the largest positive pressure is generated is away from the recording/reproducing element 13 and slightly closer the slider-air-inflow end 2. This has the effect of increasing the flying height at the recording/reproducing element 13, which is closer to the position where the flying height of the slider is lowest, because of the rotation mode about that position under low air pressure. In contrast, for the conventional slider, the position at which the largest positive pressure is generated is near the recording/reproducing element 13 or in the rearward of the recording/reproducing element 13 as can be seen from FIG. 4, because the magnetic recording/reproducing element 13 is connected with the rear-rail surface 7. When air pressure decreases, rotation is caused about this largest positive pressure generating position. This rotation mode does not produce the effect of increasing the flying height at the recording/reproducing element 13, which is near the lowest flying height position of the slider.

By positioning the rear-rail surface 7 slightly away from the recording/reproducing element 13 and slightly closer to the slider-air-inflow end 2, separately from the recording/reproducing element having surface 8 on which the recording/reproducing element 13 so that the maximum positive pressure is generated on the rear-rail surface 7 and generation of positive pressure on the recording/reproducing element having surface 8 is minimized, decrease of flying height due to an air pressure change can be reduced. With the configuration of the present embodiment, decrease of flying height due to an air pressure change can be reduced to 1 nm, or approximately 10% of the flying height, and thus the reliability of the magnetic disk unit can be significantly improved.

As has been described, the improvement in the air pressure characteristic of the air bearing surface 1 of the slider according to the first embodiment is achieved by positioning the rear-rail surface 7 which generates positive pressure slightly away from the recording/reproducing element 13 and slightly close to the slider-air-inflow 2 so that the largest positive pressure is generated at a position forward of the recording/reproducing element 13. The effect of the position in which the largest positive pressure is generated was studied as follows.

Figure 7:
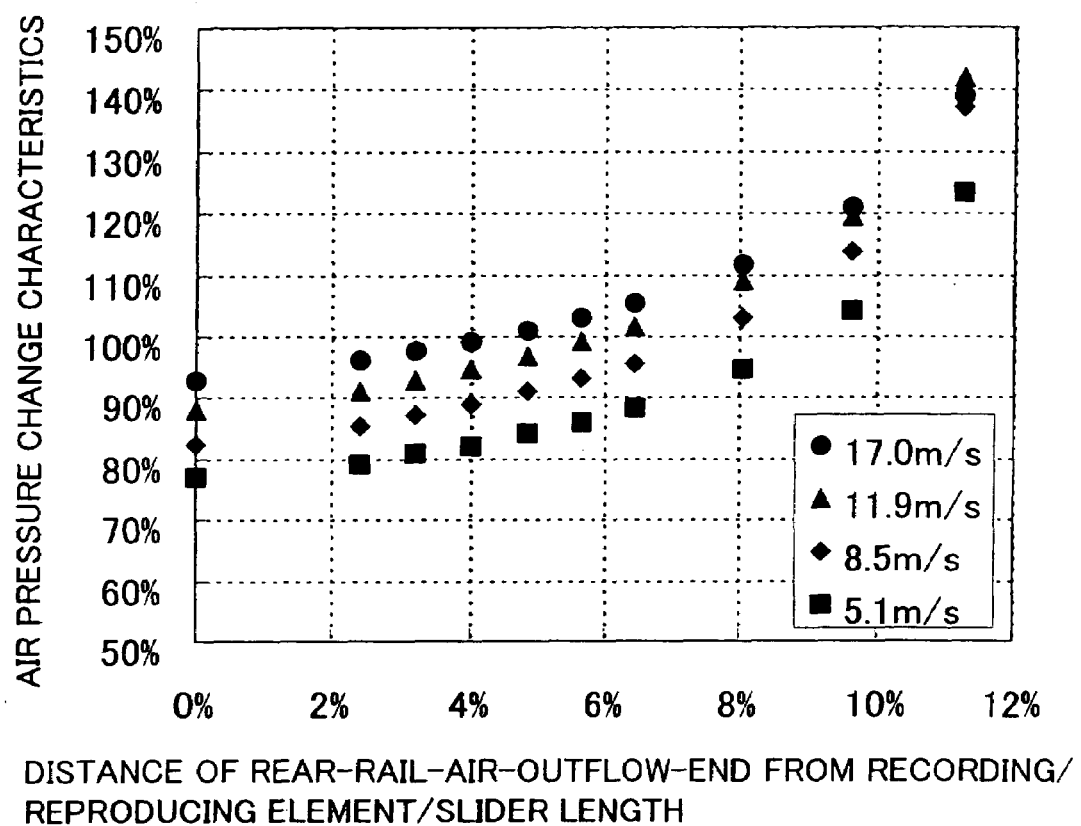
FIG. 7 is a diagram showing the relationship between the air pressure change characteristics and distance of an air-outflow end of a rear-rail surface of the slider according to the first embodiment of the present invention from a recording/reproducing element, which is normalized with the length of the slider.

FIG. 7 shows the relationship between the distance of the rear-rail surface-air-outflow end 12 from the recording/reproducing element 13, which is normalized by the length of the slider, and air pressure change characteristics. The air pressure change characteristics represent the air pressure change characteristics near the center of the data recording area of 3.5-inch, 2.5-inch, 1.8-inch, and 1.0 inch drives, calculated from flying heights measured at a skew angle of 0 at sea level and an altitude of 10,000 ft. above sea level, and at relative velocities of 17.0 m/s, 11.9 m/s, 8.5 m/s, and 5.1 m/s, respectively. FIG. 7 clearly indicates that the air pressure characteristic deteriorate as the distance of the rear-rail surface-air-inflow end 12 from the recording/reproducing element 13 decreases. However, it can be seen that adequate air pressure change characteristics can be achieved even in the smaller drives, or in other words, at any of the relative velocities, by positioning the rear-rail surface 7 at an optimum position. By positioning the air-inflow end 12 of the rear-rail surface 7 toward the slider-air-inflow end 2 by 5% or more of the length of the slider, the air pressure change characteristics can be improved by 5% or more. Thus, air pressure change characteristics of 85% or higher can be achieved at all of the velocities.

While air pressure change characteristics can be improved by positioning the air-inflow end 12 of the rear-rail surface 7 forward, variations in the flying height caused by manufacturing variations of the slider may increase because the effective area of the air bearing surface 1 is reduced with respect to the area of the entire slider by positioning the air-inflow end 12 of the rear-rail surface 7 forward.

Figure 8:
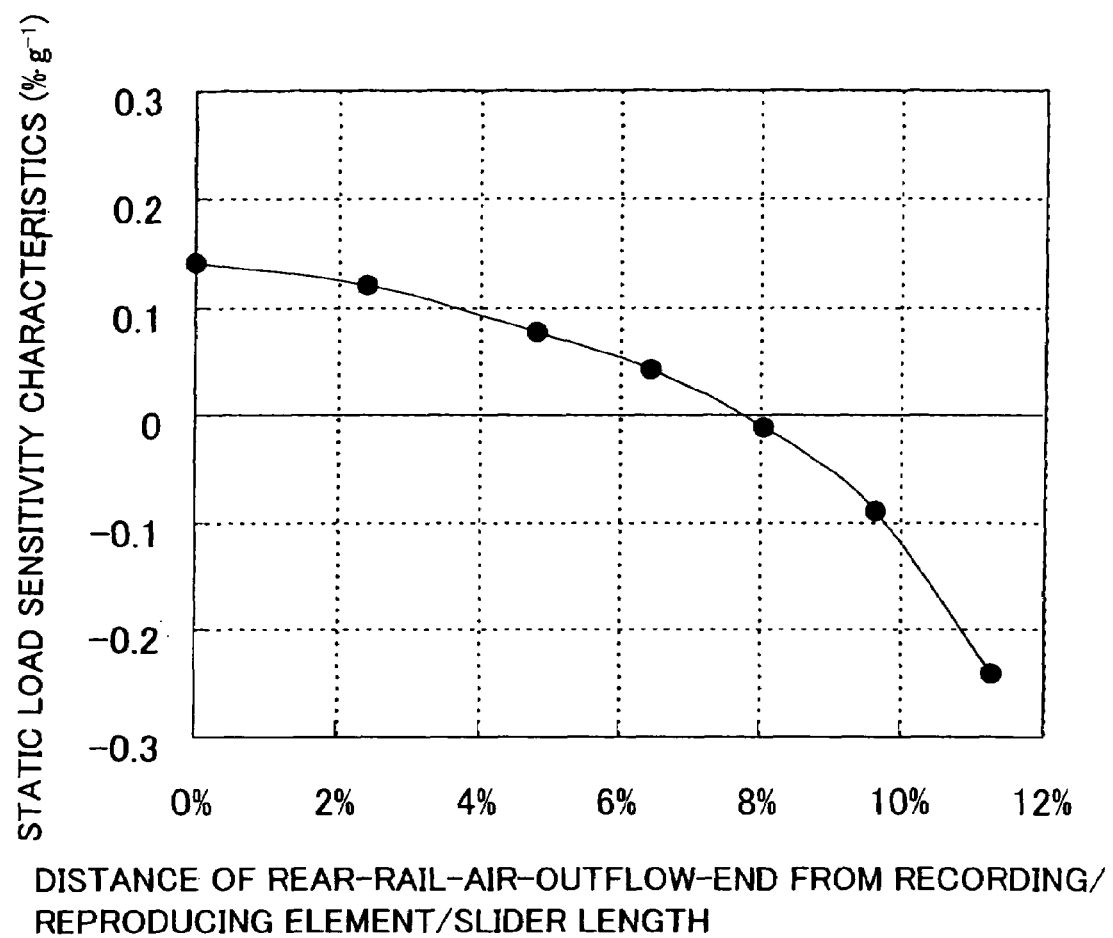
FIG. 8 is a diagram showing the relationship between static load sensitivity characteristics and the distance of the air-outflow end of the rear-rail surface of the slider according to the first embodiment of the present invention from the recording/reproducing element, which is normalized with the length of the slider.

FIG. 8 shows the relationship between the distance of the rear-rail-air-outflow end 12 from the recording/reproducing element 13, which is normalized with the length of the slider, and the static load sensitivity characteristics of the slider flying height. Static load sensitivity characteristics are represented by the ratio of a variation of the slider flying height to a variation of a static load of 1 g (gram) on the slider. Static load characteristics closer to 0 represent smaller variations in the flying height due to the static load variances produced during the manufacturing of the slider. The results shown were obtained at a radius of 21 mm at skew angle of 0, and at a revolution speed of 5,400 rpm. As can be seen from FIG. 8, although the static load sensitivity characteristics steeply degrade after the distance of the rear-rail surface-air-outflow end 12 from the recording/reproducing element 13, normalized with the length of the slider, exceeds 10%, the static load sensitivity characteristics can be improved as long as the distance is within the range between 0% and 10%, as compared with the case of 0%. Therefore, the static load sensitivity characteristics of the slider can be improved and variation of the flying height due to production variance of the slider can be reduced by positioning the rear-rail-air-outflow end 12 so that the distance of the rear-rail-air-outflow end 12 from the recording/reproducing element 13 normalized with the length of the slider falls within the range between 0% and 10%. In addition to the static load sensitivity characteristics, the air pressure change characteristics can be improved by positioning the rear-rail-air-outflow end 12 at a distance within the range between 5% and 10% from the recording/reproducing element 13 normalized with the length of the slider. Thus, air pressure change characteristics of 85% or higher can be achieved.

Figure 9:
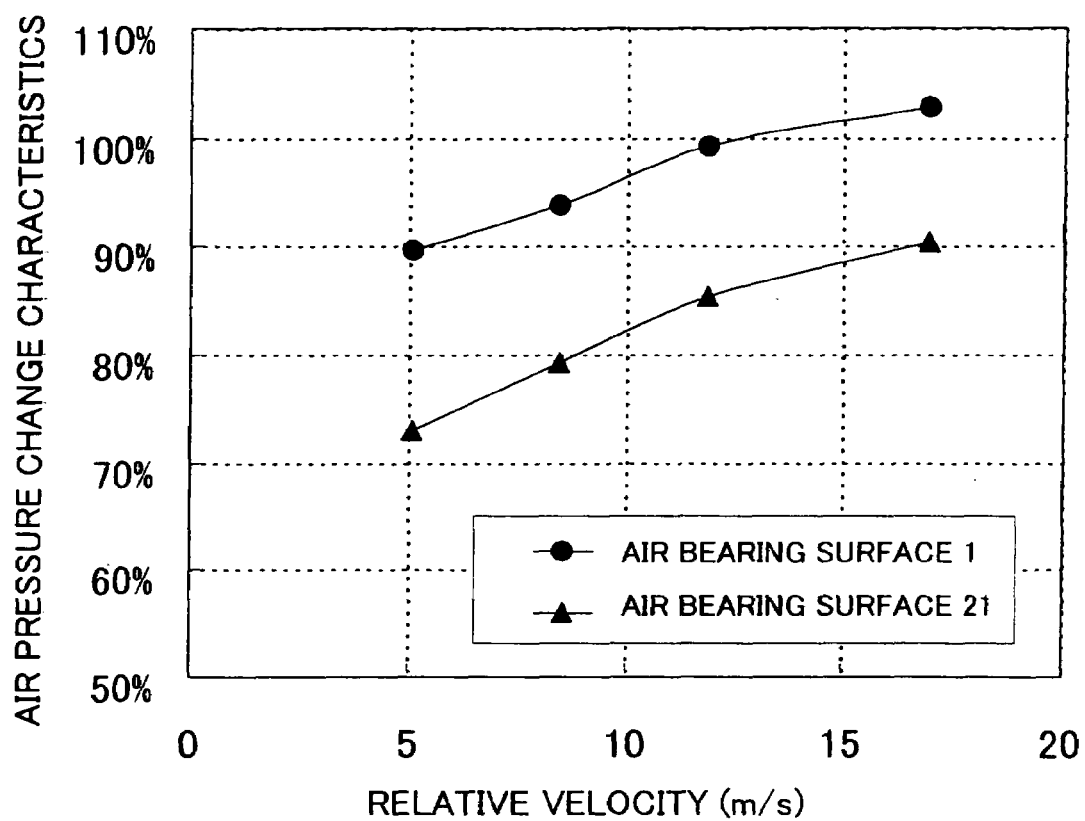
FIG. 9 is a comparative diagram of the pressure change characteristics of the slider according to the first embodiment of the present invention and the conventional slider, versus relative velocity between a head and a disk.

A study of the effect of the present invention was conducted on magnetic disk units of various sizes. FIG. 9 shows a comparison between the air pressure change characteristics of the air bearing surface 1 according to the first embodiment and those of a conventional air bearing surface 21. The air pressure change characteristics were obtained near the center of the data area of 1.0-inch, 1.8-inch, 2.5-inch, and 3.5-inch magnetic disk units. The relative velocity between the slider and the disk was 17.0 m/s in the 3.5-inch magnetic disk unit, 1.9 m/s in the 2.5-inch magnetic disk unit, 8.5 m/s in the 1.8-inch magnetic disk unit, and 5.1 m/s in the 1.0-inch magnetic disk unit. The skew angle at each position along the radius was 0 degrees.

As can be seen from FIG. 9, as the relative velocity decreases, the air pressure change characteristics degrade both in the first embodiment and the conventional arrangement. This is ascribable to reduction in an air inflow that forms the air bearing surface due to the decrease of relative velocity. In the conventional arrangement, the air pressure change characteristics are lower than 85% at a slider-disk relative velocity of lower than or equal to 12.0 m/s and lower than 80% at relative velocities lower than or equal to 8.5 m/s. In contrast, in the first embodiment, the air pressure change characteristics of 90% or higher are provided at all relative velocities. This means that the present invention has great effect on magnetic disk units that use relative velocities of 12.0 m/s and slower, especially on small magnetic units that use a relative velocity of 8.5 m/s or less. Thus, the reliability of magnetic disk units can be improved by using the slider of the first embodiment.

Figure 10:
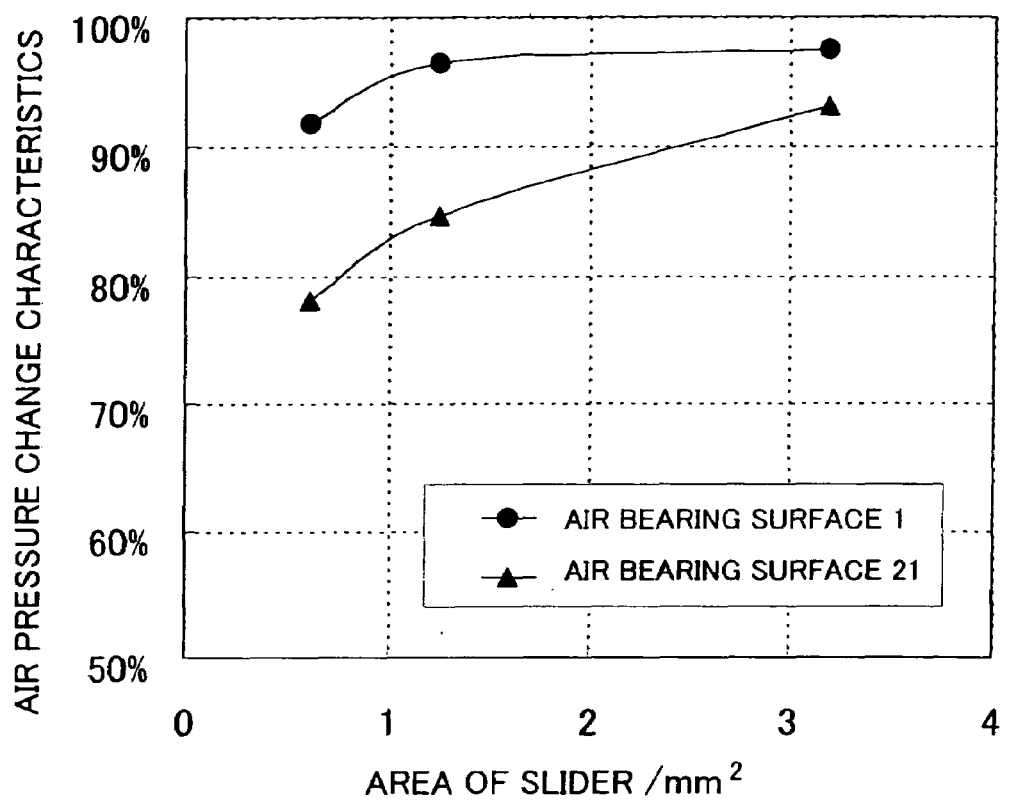
FIG. 10 is a comparative diagram of the pressure change characteristics of the slider according to the first embodiment of the present invention and the conventional slider, versus slider size.

In order to prove the effect of the present invention on the slider size, a comparison of characteristics was made by forming an air bearing surface 1 according to the first embodiment and a conventional air bearing surface 21 on three types of sliders of different sizes: nano-sliders (2.0 mm×1.6 mm), pico-sliders (1.25 mm×1.0 mm), and femto-sliders (0.87 mm×0.7 mm). When applying the air bearing surfaces 1 and 21 to the nano-sliders and pico-sliders, enlargement and reduction were performed simply according to the size of the air bearing surfaces 1 and 21. FIG. 10 shows the air pressure change characteristics obtained by flowing each slider above a position near the center of the data area of a 2.5-inch magnetic disk unit (at a radius of 21 mm of the center of), at a skew angle of 0 degrees and at a revolution speed of 5,400 rpm.

As can be seen from FIG. 10, the air pressure change characteristics degrade as the slider size is reduced, both in the case of using the air bearing surface 1 of the first embodiment and the case of using the conventional air bearing surface 21. This is ascribable to an absolute reduction in air inflow that forms the air bearing surface 1, 21 due to slider size reduction. In the nano-slider with the conventional air bearing surface, air pressure change characteristics higher than 90% were obtained without using the arrangement of the present invention. However, with the conventional arrangement, the air pressure change characteristics decreased below 85% in the pico-slider and below 80% in the femto-slider. In contrast, the air bearing surface 1 of the first embodiment provided air pressure change characteristics of 90% or more in sliders of any of the sizes. That is, the present invention has great effect especially on smaller sliders such as pico-sliders and femto-sliders, and the reliability of magnetic disk units can be improved by using the slider according to first embodiment.

As has been described, according to the first embodiment of the present invention, static load sensitivity characteristics as well as the air change characteristics can be improved and the air pressure change characteristics of 85% or higher can be achieve by positioning the rear-rail-air-outflow end 12 so that the distance of the rear-rail-air-outflow end 12 from the recording/reproducing element 13, normalized with the length of the slider, falls within the range between 5% and 10% of the full length of the slider. Furthermore, the present invention has greater effect on small-size HDDs which use slow slider-disk relative velocities and on smaller sliders such as femto-sliders, and can reduce decrease of flying height in a low air pressure environment.

Figure 11A:
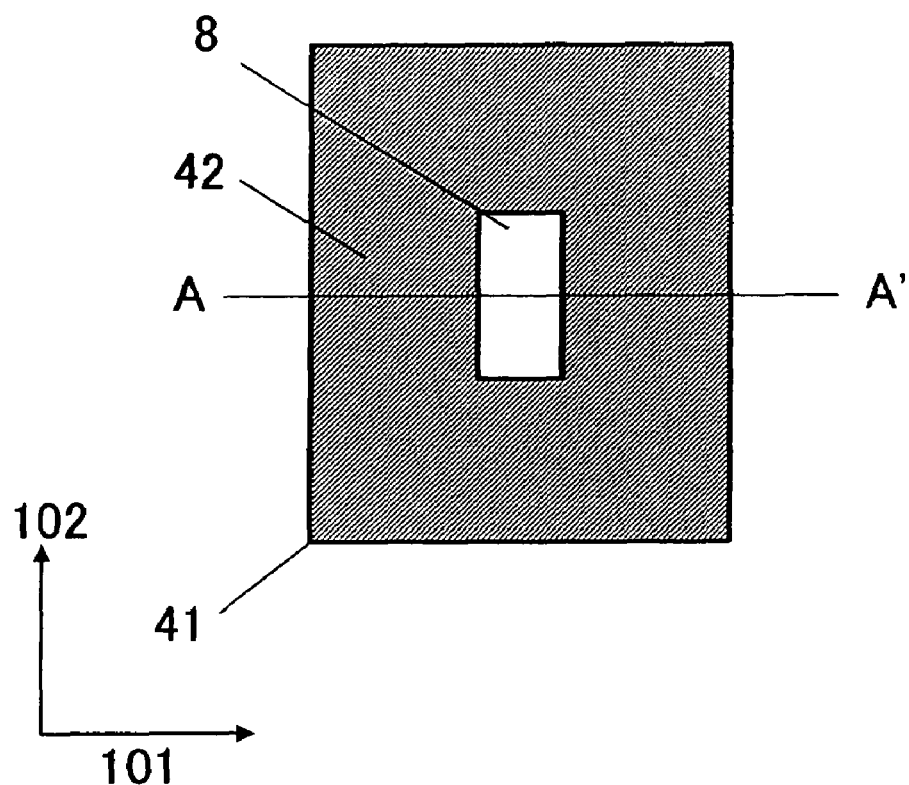
FIG. 11A is a plan view showing a structure of a surface having a recording/reproducing element and its surrounding region.
Figure 11B:
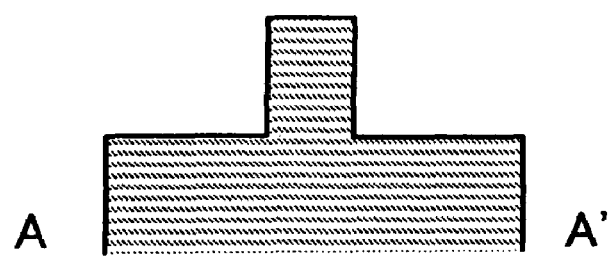
FIG. 11B is a cross-sectional view taken along line A-A' in FIG. 11A.
Figure 12:
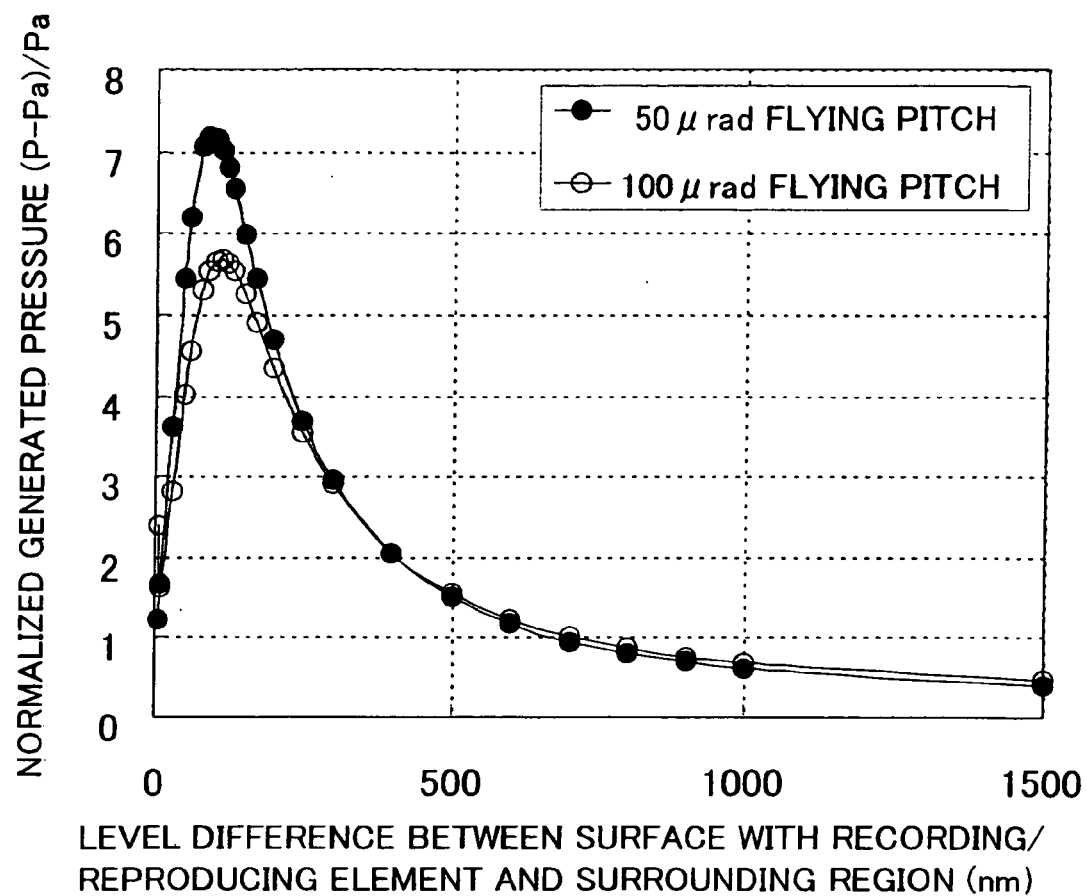
FIG. 12 is a diagram showing the relationship of the level difference between the surface having the recording/reproducing element and its surrounding region, to generated pressure.

The present invention obviously produces greater effect by reducing the generation of positive pressure on the recording/reproducing element having surface 8. However, the negative pressure cavity 13 near the recording/reproducing element may function as a step bearing surface because of the depth of the negative pressure cavity 11. Therefore, a study was conducted on the effect of the level difference between the recording/reproducing element having surface 8 and the plane of the surrounding region on the generation of positive pressure. The results are shown in FIGS. 11 and 12. As shown in FIG. 11, an air bearing surface 41 consisting only of a recording/reproducing element having surface 8 and a cavity 42 surrounding the recording/reproducing element was assumed and the generation of positive pressure was obtained through analysis using a modified Reynolds equation. The air bearing surface 41 shown in FIG. 11 has a length of 250 μm in the slider pitch direction (direction 101) and a length of 300 μm in the slider roll direction (direction 102). The recording/reproducing element having surface 8 has a length of 50 μm in the slider pitch direction and a length of 100 μm in the slider roll direction. In reality, the generated pressures were calculated with a flying height, at the air-outflow end, of 10 nm, and a roll angle of 0 μrad, and with two different pitch angles of 50 μrad and 100 μrad. The level difference between the recording/reproducing element having surface 8 and the plane of the surrounding region were varied between 10 and 1,500 nm. FIG. 12 shows the relationship between the generated pressure normalized with 1 atmospheric pressure and the level difference, obtained from the calculation. It can be seen that the normalized generated pressure steeply rises in the region where the level difference is 300-400 nm, and reaches the maximum value at a level difference of approximately 100 nm in each of the cases where the flying pitch altitude is 50 μrad and 100 μrad.

This result shows that the effect of the present invention may decrease when the level difference between the recording/reproducing element having surface 8 and the plane of its surrounding region becomes 300-400 nm because the negative-pressure cavity 11 functions as a step bearing surface for the recording/reproducing element having surface 8.

Second Embodiment

Figure 13A:
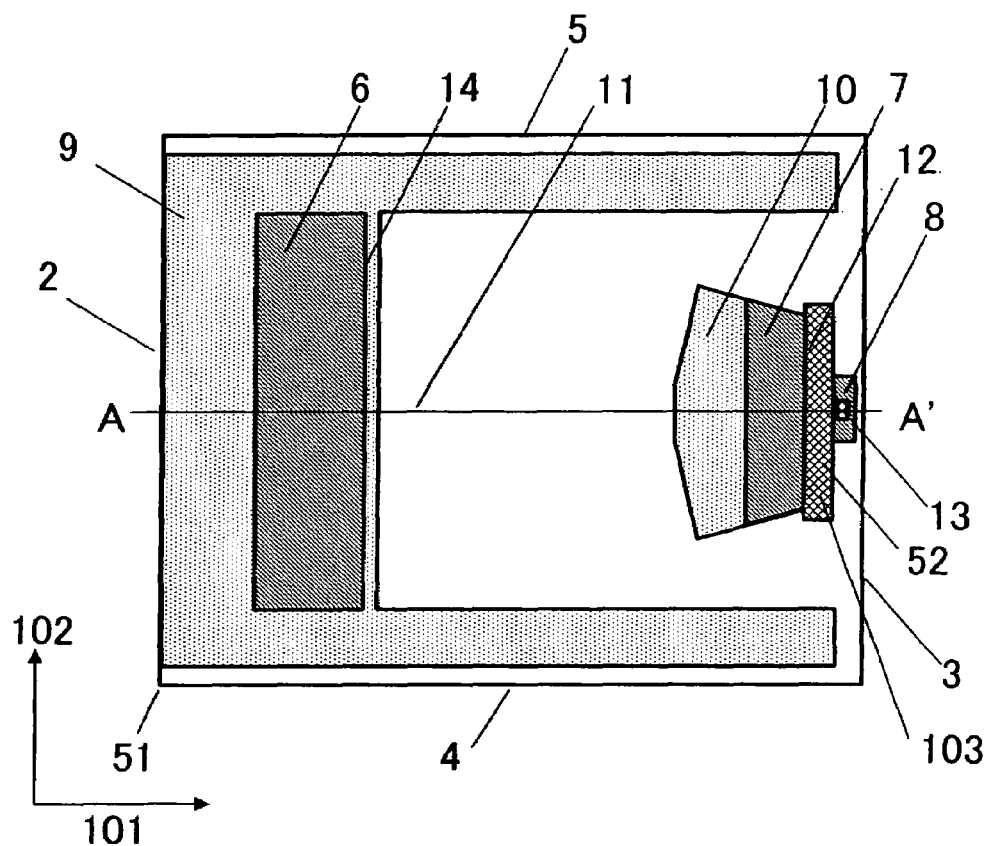
FIG. 13A is a plan view of a slider according to a second embodiment of the present invention.
Figure 13B:
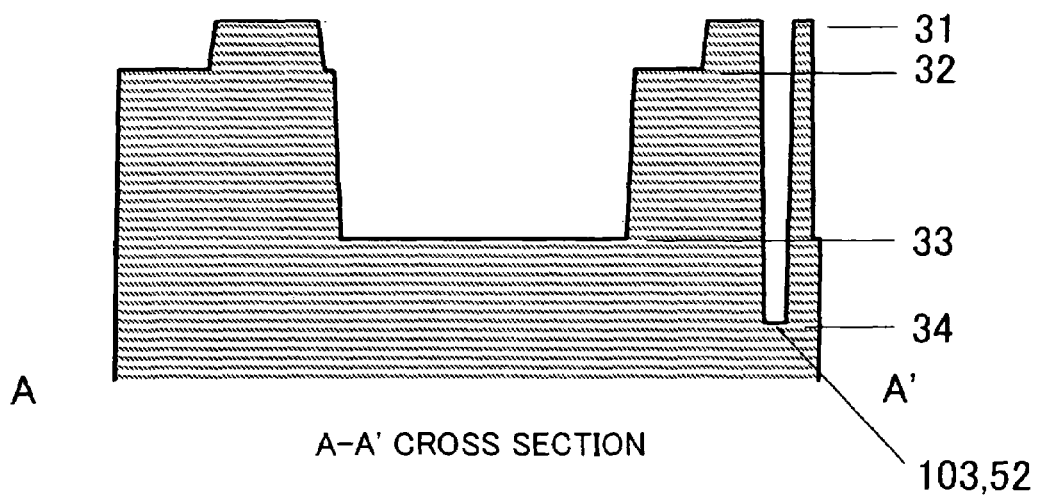
FIG. 13B is a cross-sectional view of the slider taken along line A-A' in FIG. 13A.

FIG. 13 shows a plan view of a slider according to a second embodiment of the present invention and a cross-sectional view taken along A-A' line in the plan view. The air bearing surface 51 of the slider in the second embodiment differs from the air bearing surface 1 in the first embodiment in that a plane (fourth plane) 34 with a fourth depth different from that of the third plane 33 formed by the negative-pressure cavity 11 is formed by a recording/reproducing element-fore-trench 52 between the rear-rail surface-air-outflow end 12 and the recording/reproducing element having surface 8 of the slider.

Figure 14:
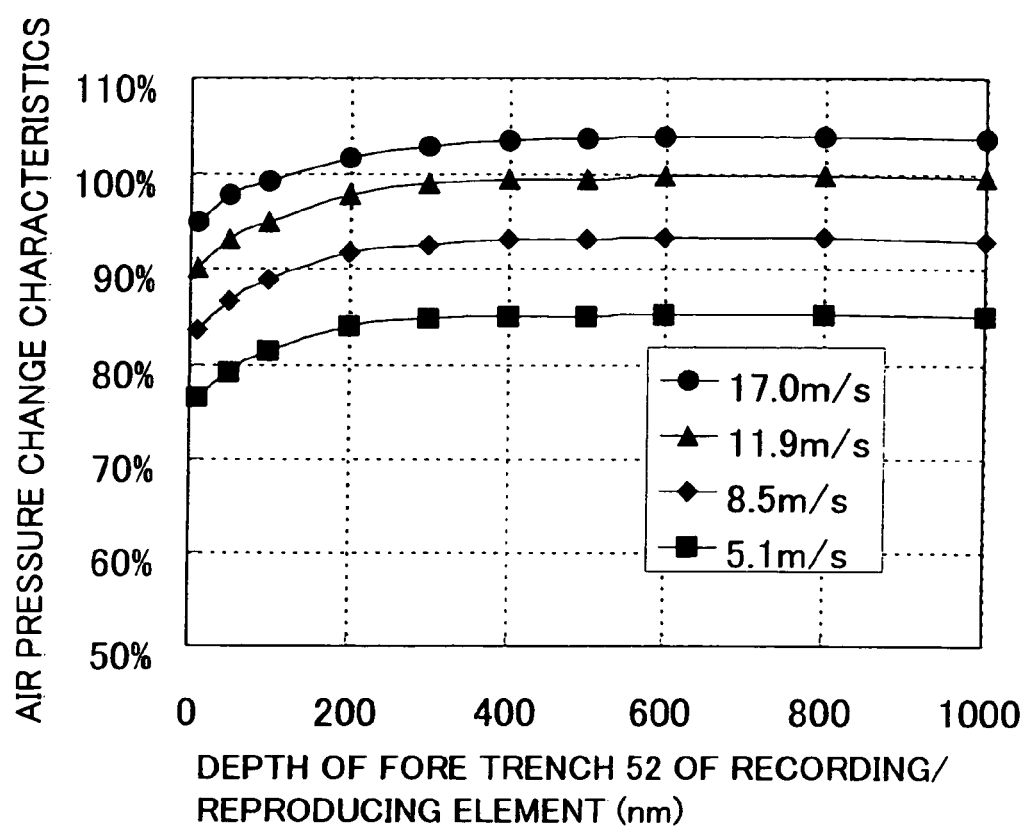
FIG. 14 is a diagram showing the relationship between the depth of a recording/reproducing element-fore-trench of the slider according to the second embodiment of the present invention and the air pressure change characteristics.

With this air bearing surface 51, the effect of the level difference between the recording/reproducing element having surface 8 and its air-inflow end was investigated. FIG. 14 shows the air pressure change characteristics versus the depth of the recording/reproducing element-fore-trench 52 having a plane 34 with the fourth depth. As in the case shown in FIG. 7, 1.0-inch, 1.8-inch, 2.5-inch, and 3.5-inch drives are assumed and experiments were conducted at relative velocities of 5.1 m/s, 8.5 m/s, 11.9 m/s, and 17.0 m/s at a skew angle of 0 degrees.

Like the results of the studies shown in FIGS. 11 and 12, the results in FIG. 14 shows that the air pressure change characteristics degrades as the depth of the separating plane 103 (recording/reproducing element-fore-trench 52) having the fourth depth, provided between the rear-rail surface-air-inflow end 12 and the recording/reproducing element having surface 8 becomes shallow. This degradation is ascribable to positive pressure generated at the recording/reproducing element 13, as demonstrated in FIGS. 11 and 12. The experiments demonstrate that good air pressure change characteristics of 85% or higher can be achieved at any speeds if the depth of the recording/reproducing element-fore-trench 52 is 300 nm or more.

Therefore, by providing the recording/reproducing element-fore-trench 52 with a depth of 300 nm or more, the air pressure change characteristics can be improved effectively and the reliability of the magnetic disk unit can be significantly improved. The depth of the recording/reproducing element-fore-trench 52 maybe shallower or deeper than that of the negative-pressure cavity 11, depending on the structure of the air bearing surface 51, regardless of the depth of the negative-pressure cavity 11.

Third Embodiment

Figure 15:
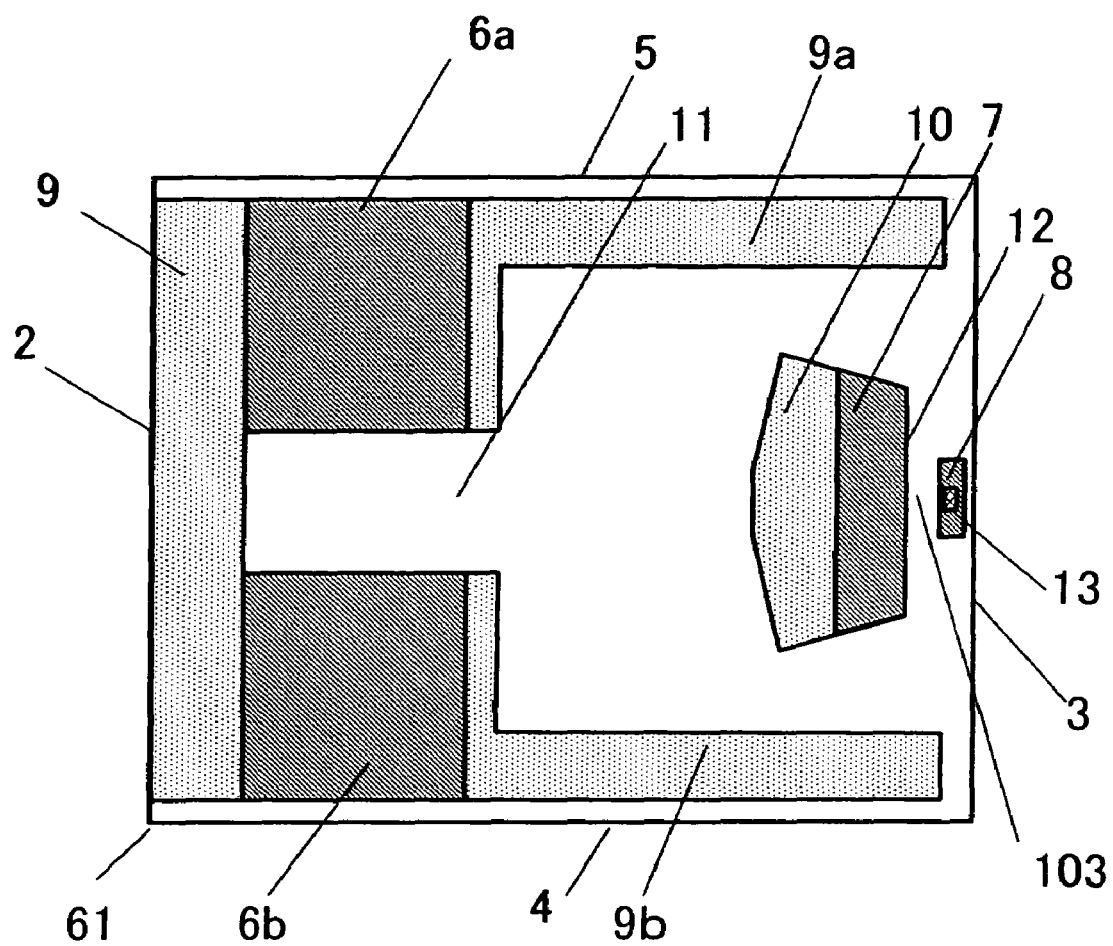
FIG. 15 is a plan view of a slider according to a third embodiment of the present invention.

FIG. 15 shows a plan view of a slider according to a third embodiment of the present invention. In FIG. 15, the portions that are the same as or equivalent to those in the first embodiment are labeled with the same reference numerals. In the third embodiment, the front-rail surface is separated by a negative-pressure cavity 11 into two: a front-rail surface 6b along the disk-inner-radius end 4 of the slider and a front-rail surface 6a along the disk outer radius end 5 of the slider. The slider of the third embodiment also has a separating surface 103 with a cavity depth of 300 nm or more that separates the recording/reproducing element having surface 8 from the rear-rails surface 7. The air-inflow end 12 of the rear-rail surface 7 is positioned away from the recording/reproducing element 13 toward the slider-air-inflow end 2 by 5 to 10% of the length of the slider in the direction of the slider pitch. Obviously, an effect similar to that of the first embodiment can be produced by the structure shown in FIG. 15. Thus, in the present embodiments, there are no restrictions on the geometry of the front-rail surface.

Fourth Embodiment

Figure 16:
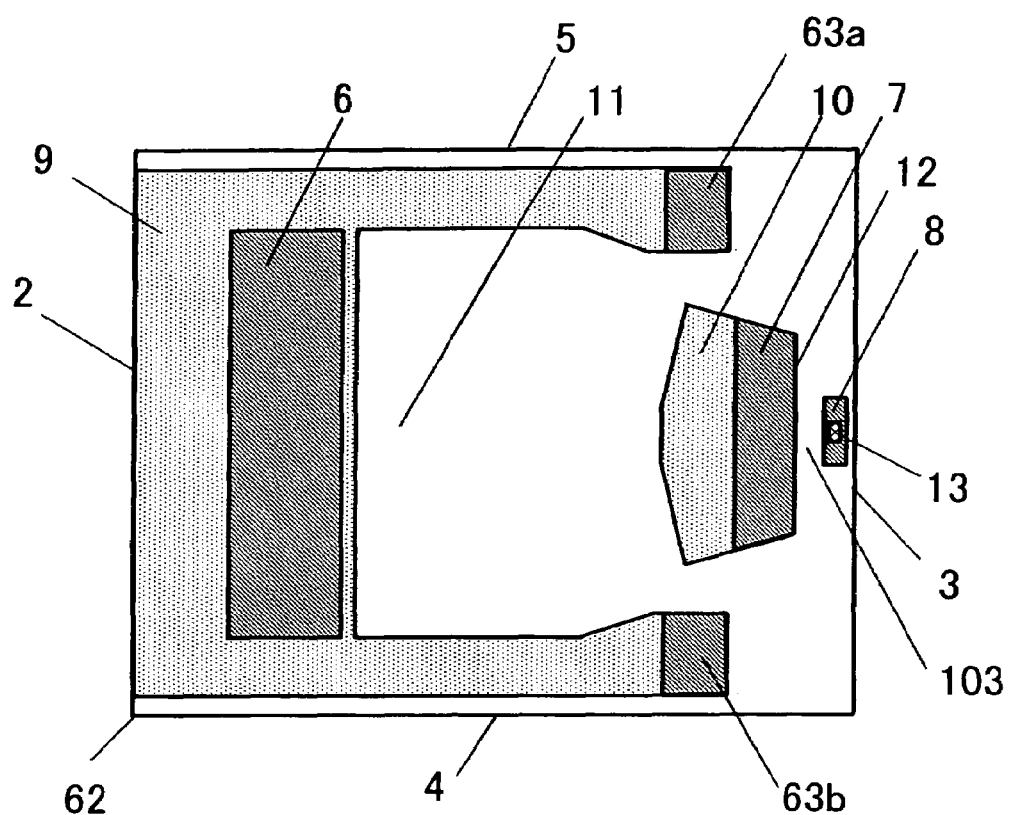
FIG. 16 is a plan view of a slider according to a fourth embodiment of the present invention.
Figure 17:
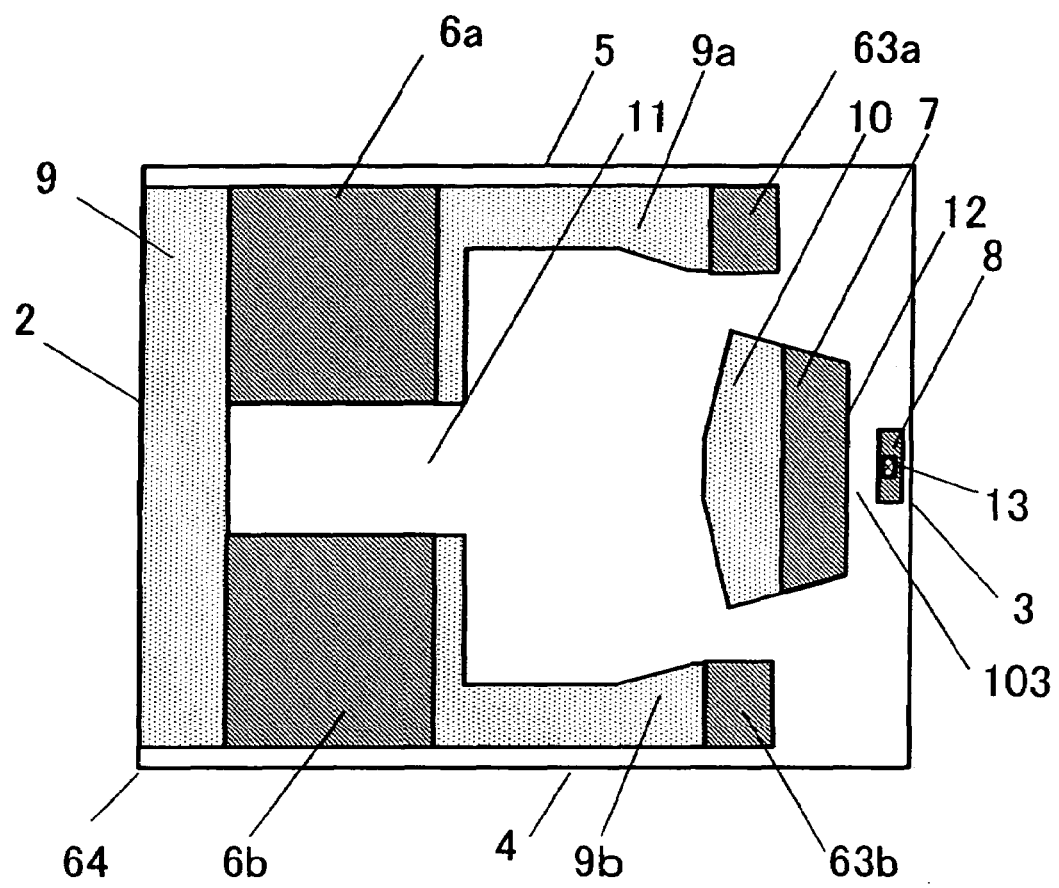
FIG. 17 is a plan view of another slider according to the fourth embodiment of the present invention.

FIGS. 16 and 17 show plan views of a slider according to a fourth embodiment of the present invention. The air bearing surface 62 of the slider shown in FIG. 16 has a configuration in which a middle rails 63a and 63b are attached to the front-step-bearing surfaces 9. The air bearing surface 64 of the slider shown in FIG. 17 has a configuration in which middle rails 63a and 63b are attached to the front-pad-rear-step bearing surface 9a and 9b, respectively. Providing these middle rails 63a and 63b separately from the front-rail surface(s) 6, 6a, 6b and the rear-rail surface 7 can improve the air pressure change characteristics as well as the rigidity of the air bearing surface 63, 64 in the roll direction and the controllability of the roll attitude of the slide while flying.

Fifth Embodiment

Figure 18:
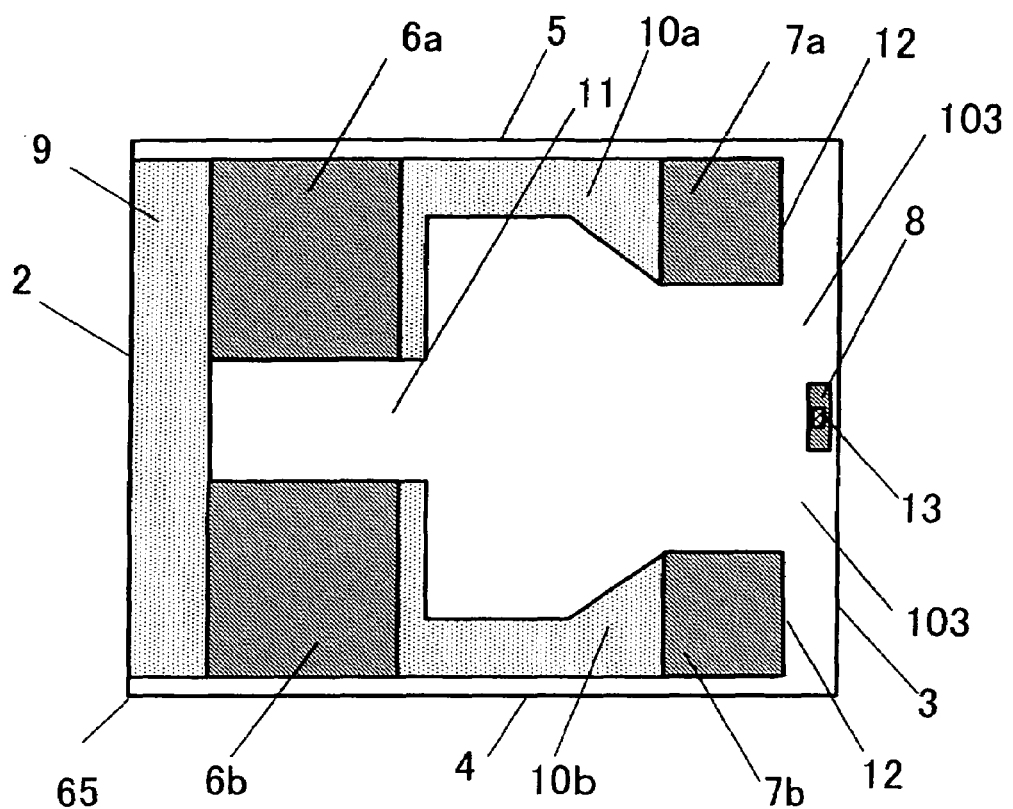
FIG. 18 is a plan view of a slider according to a fifth embodiment of the present invention.

FIG. 18 shows a plan view of a slider according to a fifth embodiment of the present invention. In the air bearing surface 65 shown in FIG. 18, the front-rail surface is separated into two: front-rail surface 6b along the disk-inner-radius end 4 of the slider and a front-rail surface 6a along the disk-outer-radius end 5 of the slider. Also, the rear-rail surface is separated into a rear-rail surface 7b along the disk-inner-radius end 4 of the slider and a front-rail surface 7a along the disk-outer-radius end 5 of the slider. Rear step bearing surfaces 10a and 10b are provided contiguously to the air-inflow ends of the rear-rail surfaces 7a and 7b, respectively. The rear step bearing surfaces 10a and 10b are contiguous to the front-pad-rail surfaces 6a and 6b, respectively.

The air pressure change characteristics of the slider in which separated rear-rail surfaces 7a and 7b are provided in this way can also be improved by separating the recording/reproducing element having surface 8 from the rear-rail surfaces 7a and 7b by a separating plane 103 with a depth of 300 nm or more and by positioning each of the air-inflow ends 12 of the rear-rail surfaces 7a and 7b slightly away from the recording/reproducing head 13 and close to the slider-air-inflow end 2 by 5 to 10% of the length of the slider in the direction of the slider pitch.

Sixth Embodiment

Figure 19:
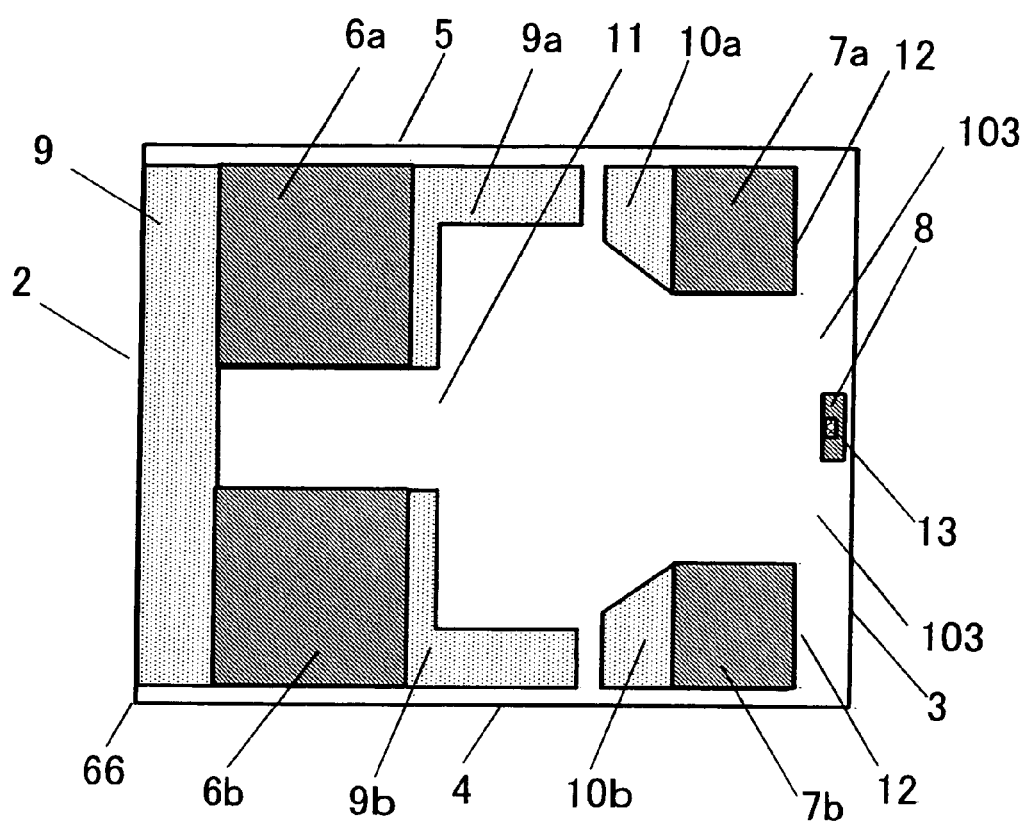
FIG. 19 is a plan view of a slider according to a sixth embodiment of the present invention.

FIG. 19 shows a plan view of a slider according to a sixth embodiment of the present invention. On the air bearing surface 66 of the slider shown in FIG. 19, the front-rail surface is separated by a negative-pressure cavity 11 into two: a front-rail surface 6b along the disk-inner-radius end 4 of the slider and a front-rail surface 6a along the disk-outer-radius end 5 of the slider. Also, the rear-rail surface is separated by a negative-pressure cavity 11 into two: a rear-rail surface 7b along the disk-inner-radius end 4 of the slider and a front-rail surface 7a along the disk-outer-radius end 5 of the slider. Rear step bearing surfaces 10a and 10b are provided contiguously to the air-inflow ends of the rear-rail and front-rail-surfaces 7a and 7b, respectively. The negative-pressure cavity 11 separates the rear step bearing surfaces 10a and 10b from the front pads 6a and 6b.

The effect of this configuration is the same as that of the sixth embodiment and other embodiments described above: the air pressure change characteristics are improved because the recording/reproducing element having surface 8 is separated from the rear-rail surfaces 7a and 7b by a separating plane 103 with a depth of 300 nm or more and the air-inflow ends 12 of the rear-rail surfaces 7a and 7b are positioned slightly away form the recording/reproducing element 13 and close the air-inflow end 2 of the slider by 5 to 10% of the length of the slider in the direction of slider pitch.

Figure 20:
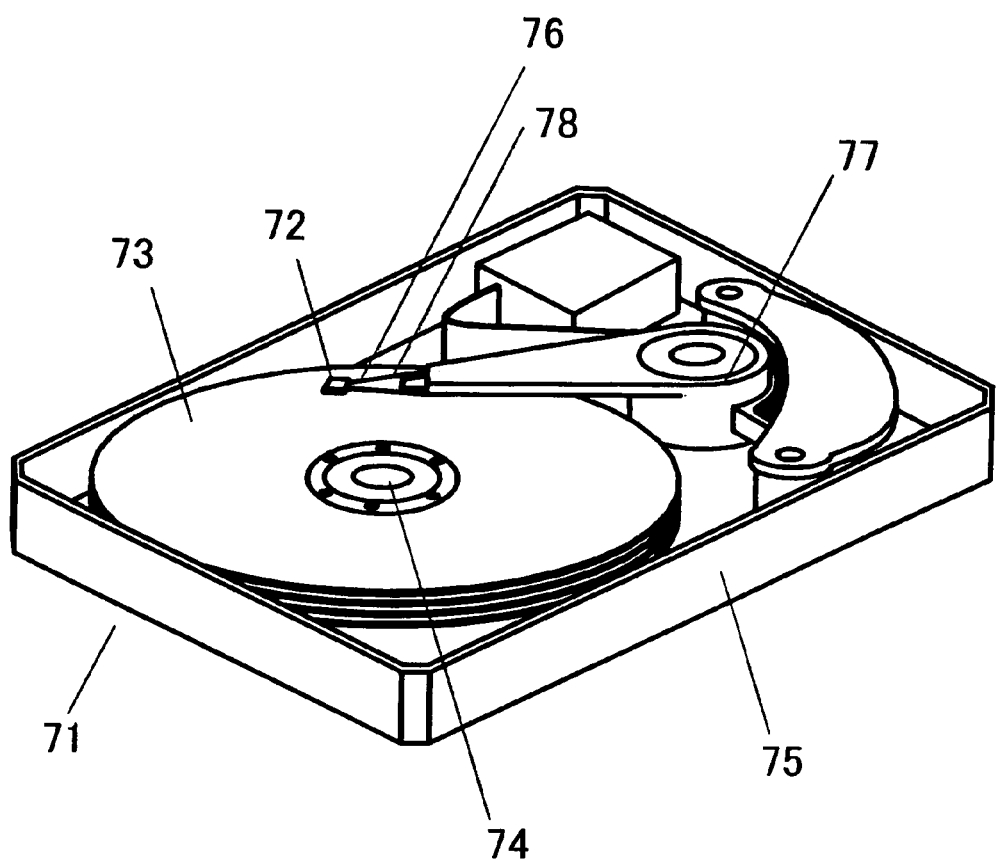
FIG. 20 is a perspective view of a disk recording unit with a slider.

Any of the sliders (magnetic head sliders) according to these embodiments can be used in a magnetic disk unit 71 shown in FIG. 20. The magnetic disk unit includes a contact start-stop mechanism. When not in operation, the magnetic head 72 rests over a magnetic disk 73. When the magnetic disk unit (hard disk unit) is activated, a spindle motor 74 starts rotating and the magnetic head is flied on air flown into the gap between the magnetic disk and the magnetic head (slider) 72. The slider 72 of the present invention can be used with any magnetic disk unit with any mechanisms or configuration. The slider 72 of the present invention can also be incorporated in a magnetic disk unit that includes a ramp loading mechanism which positions the magnetic head at a retracting ramp when the drive is not in operation and loads and unloads the magnetic head above the magnetic disk only when the drive is in operation. Therefore, the reliability of any disk drive with any drive configuration under low air pressure can be improved because of improved air pressure change characteristics.

It is difficult to incorporate a disk larger than 1.8 inches into a PCMCIA-compliant magnetic disk units because of their structure. Also, magnetic disk units compliant with the Compact Flash (registered trademark) standard can incorporate only 1.0-inch disks or smaller because of their structure. Especially in such a small-size magnetic disk unit, the air-pressure characteristics and therefore the reliability under low air pressure can be improved by incorporating a slider according to the present invention.

A slider according to the present invention and a magnetic disk unit that uses the slider have the feature that can significantly reduce variations in flying height caused by changes in air pressure and therefore are useful as a magnetic head slider for hard disks and magnetic hard disk units.

The invention claimed is:

1. A slider for use in a magnetic disk unit, the slider comprising:
   a recording/reproducing element for recording and/or reproducing data on a disk medium; and
   an air bearing surface for facing a disk medium, said air bearing surface comprising an air-inflow end at one end and an air-outflow end at another end of the air bearing surface, comprising:
   a front step bearing surface;
   at least one front-rail surface which generates a positive pressure on the disk medium to float the slider;
   a negative-pressure cavity which generates a negative pressure to reduce the flying height of the slider;
   a rear-step bearing surface;
   at least one rear-rail surface which generates a positive pressure; and
   a recording/reproducing element surface on which the recording/reproducing element is provided,
   wherein a separating distance separates the recording/reproducing element surface from the rear-rail surface and the separating distance between the rear-rail surface and the recording/reproducing element is 5 to 10% of a distance from the air-inflow end to the air-outflow end.

2. The slider according to claim 1, wherein the at least one front rail surface is positioned in a direction parallel to a slider roll direction.

3. The slider according to claim 2, wherein the at least one front rail surface is positioned in two positions along the slider roll direction, one of which is positioned along an inner-radius end of the slider and another is positioned along an outer-radius end of the slider.

4. The slider according to claim 1, wherein the front-step-bearing surface surrounds the front-rail surface and extends along the inner-radius-side and the outer-radius-side of the slider towards the air-outflow end, and the front-step-bearing surface comprises a middle rail which generates a positive pressure in an extending portion.

5. The slider according to claim 1, wherein the separating distance has a depth of 300 nm or more in the direction of a negative-pressure cavity.

6. The slider according to claim 1, wherein the at least one front-rail surface, the at least one rear-rail surface, and the recording/reproducing element surface form a first plane having a highest height in a direction of a height of the slider, the front-step-bearing surface and the rear-step-bearing surface form a second plane having a second highest height in the direction of the height of the slider, and the negative-pressure cavity forms a third plane having a lowest height in the direction of the height of the slider.

7. The slider according to claim 6, wherein the separating distance is at a fourth plane having a height of 300 nm or more which is different from the height of the negative-pressure cavity, in the direction of the height of the slider.

8. The slider according to claim 7, wherein the separating distance is formed at the fourth plane which is lowest in height among the first to fourth planes.

9. The slider according to claim 1, wherein the at least one front-rail surface extends from the air-inflow-end in a direction orthogonal to the direction of the air-outflow end, and the at least one rear-step-bearing-surface is on the air-outflow-end side of the front-rail surface.

10. The slider according to claim 1, wherein a recording element of the recording/reproducing element is formed by a magnetoresistive effect.

11. The slider according to claim 1, wherein the air bearing surface has a length of 1.25 mm or less and a width of 1.0 mm or less.

12. The slider according to claim 1, wherein the slider is incorporated into a magnetic disk unit comprising the disk medium and a disk rotation driving section for rotating the disk medium, and the slider is attached on a leading end of a suspension.

13. The magnetic disk with slider unit according to claim 12, for performing recording/reproducing with a relative velocity between the slider and the disk medium of 12 m/s or less.

14. The magnetic disk with slider unit according to claim 12, wherein the magnetic disk is compliant with the PCMCIA standard.

15. The magnetic disk with slider unit according to claim 12, wherein the magnetic disk is compliant with the Compact Flash standard.

* * * * *